(12) United States Patent
Milton

(10) Patent No.: US 8,196,085 B1
(45) Date of Patent: Jun. 5, 2012

(54) INTERACTIVE DESIGN OPTIMIZATION TECHNIQUES AND INTERFACE

(75) Inventor: David Ian M. Milton, Brooklin (CA)

(73) Assignee: Altera Corporation, San Jose, CA (US)

( * ) Notice: Subject to any disclaimer, the term of this patent is extended or adjusted under 35 U.S.C. 154(b) by 262 days.

(21) Appl. No.: 12/690,059

(22) Filed: Jan. 19, 2010

(51) Int. Cl.
*G06F 17/50* (2006.01)

(52) U.S. Cl. ........ 716/133; 716/102; 716/118; 716/119; 716/139

(58) Field of Classification Search .................. 716/100, 716/102, 118, 119, 132, 133, 139
See application file for complete search history.

(56) References Cited

U.S. PATENT DOCUMENTS

| | | | |
|---|---|---|---|
| 5,623,418 A * | 4/1997 | Rostoker et al. | 716/102 |
| 5,896,301 A * | 4/1999 | Barrientos | 716/113 |
| 5,903,472 A * | 5/1999 | Barrientos | 716/113 |
| 5,910,899 A * | 6/1999 | Barrientos | 716/118 |
| 6,161,211 A * | 12/2000 | Southgate | 716/102 |
| 7,065,481 B2 * | 6/2006 | Schubert et al. | 703/14 |
| 7,328,420 B1 * | 2/2008 | Datta et al. | 716/102 |
| 7,559,046 B1 * | 7/2009 | Datta et al. | 716/134 |
| 7,840,928 B1 * | 11/2010 | Datta et al. | 716/122 |

* cited by examiner

*Primary Examiner* — Sun Lin
(74) *Attorney, Agent, or Firm* — Womble Carlyle Sandridge & Rice LLP

(57) ABSTRACT

Techniques for analyzing and optimizing a design on an integrated circuit (IC) are provided. The techniques include an interface that aids interactive optimization. A visual indicator is generated based on the power usage value of each of the logic blocks in the design. The visual indicator can be overlaid on top of a floorplan layout of the IC to highlight the parts of the design that may be further optimized. The visual indicator can be updated in real time to highlight the optimizations that have been achieved by the changes made to the design. The real time update of the visual indicator may allow multiple changes to be made to the design before the design is recompiled with a design program.

20 Claims, 7 Drawing Sheets

INTERACTIVE DESIGN OPTIMIZATION TECHNIQUES AND INTERFACE

BACKGROUND

Electronic design automation (EDA) tools or applications are generally used by circuit developers to design integrated circuits (ICs). An IC may include many blocks of logic circuitry, registers, memory blocks, input/output (I/O) blocks, etc. These blocks may be configurable to perform different tasks. A generic routing or interconnection structure is typically used to connect the various blocks and circuitries within the IC in different ways. All these configurations are usually done using an EDA tool.

Designing an IC on an EDA tool generally includes, among others, floorplanning, synthesizing and translating the register transfer level (RTL) description of the circuit into a discrete netlist of logic-gate primitives, placing and routing the many components of the synthesized gate-level netlist, and analyzing and optimizing the IC to reduce power usage. Power analysis and optimization is one of the most important areas in circuit design.

Reducing power consumption and optimizing circuits for power dissipation is important to circuit developers. With the increasing speed and complexity in IC designs, power consumption is regarded as one of the limiting factors in IC designs. The increasing complexity also means that a completely manual power optimization is not generally feasible because the process will be too cumbersome and prone to contain errors. Therefore, a typical EDA tool will include a variety of power optimization techniques that can be used to optimize an IC design. However, some power optimizations that require a functional change to the design cannot be done automatically. These changes require user interaction because they usually require modifications to be made to the design structure.

Therefore, it is desirable to quickly point out the areas of potential optimization on an IC and provide circuit developers with real-time feedback based on the changes made. It is also desirable to update the design and perform power analysis based on multiple changes made to the design without having to perform a full compilation on the design. It is within this context that the invention arises.

SUMMARY

Embodiments of the present invention include methods for analyzing and optimizing an integrated circuit (IC) design.

It should be appreciated that the present invention can be implemented in numerous ways, such as a process an apparatus, a system, a device or a method on a computer readable medium. Several inventive embodiments of the present invention are described below.

In one embodiment, a method for analyzing a design on an IC is disclosed. The method includes determining a power usage value on every logic element or component in the IC. Based on that value, a visual indicator, e.g., a color map, is generated. The visual indicator is then overlaid on a floorplan layout of the IC. The visual indicator may highlight different areas on the IC that can be optimized. A prompt with information on how to optimize the design is provided based on the power usage value of each of the components in the IC design.

In another embodiment, a machine-readable storage medium encoded with machine-readable instructions for analyzing a design on an IC is disclosed. The machine-readable storage medium has program instructions for compiling the IC design with a design program. The machine-readable medium also has program instructions for calculating the power dissipation value for each of the circuit elements in the IC design and displaying a visual indicator based on the calculated value.

In yet another embodiment in accordance with the present invention, a method for analyzing a design on an IC is provided. The design is first compiled with a design program. After the design has been compiled, the usage value for every component in the design is determined. A visual indicator is then generated based on the usage value of every component in the design. For instance, the visual indicator may be a color map with different colors used to highlight the power usage of every component in the design. The visual indicator is placed over a floorplan layout of the IC. The floorplan layout shows the placement locations of all the components in the design and the visual indicator, overlaid on the floorplan layout, highlights potential areas of optimizations in the design. User input is received and the design is updated based on the user input. According to one embodiment, the design is updated without a recompile operation.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods for analyzing and optimizing an integrated circuit (IC) design.

It will be obvious, however, to one skilled in the art, that the present invention may be practiced without some or all of these specific details. In other instances, well-known operations have not been described in detail in order not to unnecessarily obscure the present invention.

The embodiments described herein provide techniques to analyze and perform optimizations on an IC design based on user input without having to perform a full compilation to the design each time a modification is made to the design. In one of the embodiments, a visual indicator, e.g. a color map, that illustrates the areas of potential optimizations on an IC design is overlaid on a floorplan layout of the IC design. Different areas on the IC are colored with different colors to highlight the parts of the design which can be optimized for power. The color map, placed over the floorplan layout, allows the user to quickly pinpoint the potential areas for optimization.

Figure 1:
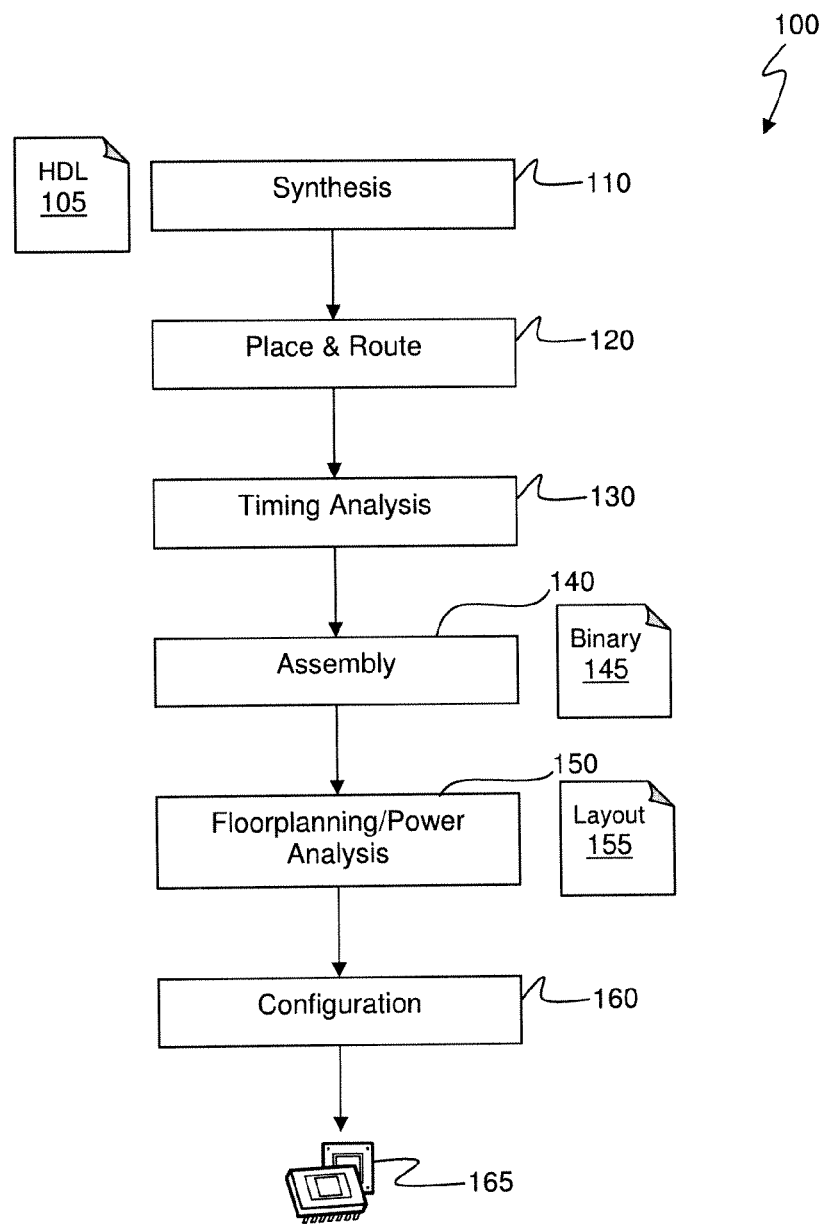
FIG. 1, meant to be illustrative and not limiting, shows a compilation flow to create a compiled design for an IC using an electronic design automation (EDA) tool, according to one embodiment.

FIG. 1, meant to be illustrative and not limiting, shows compilation flow 100 to create a compiled design for an IC using an electronic design automation (EDA) tool, according to one embodiment. The flow starts with an IC design created by a circuit developer or a hardware engineer that is embodied in a hardware description language (HDL) file 105. The IC design embodied in the HDL file is synthesized and translated into a discrete netlist of logic-gate primitives during synthesis operation 110. The synthesized logic gates and other components in the IC design are placed on the IC device during place and route operation 120. Wires are also added to connect the logic gates and all the other components in the IC to route signals in the IC design during place and route operation 120. After place and route operation 120, timing analysis operation 130 assigns delays to the different logic gates and wires or routes in the circuit. Timing analysis operation 130 computes the lengths of different paths in the IC design and the timing constraints of the IC design, in one embodiment. Binary configuration file 145 is created during assembly operation 140. In one embodiment, binary configuration file 145 contains description of the circuit of the IC design and is used to program IC device 165 during configuration operation 160. However, before configuring IC device 165, floorplan layout 155 of the IC design can be generated in floorplanning and power analysis operation 150.

Referring still to FIG. 1, floorplan layout 155 is a visual representation showing the expected locations for logic gates and other components within the IC device. In one embodiment in accordance with the present invention, floorplan layout 155 highlights the potential areas in the IC design for optimization. In another embodiment, floorplanning and power analysis operation 150 can be performed multiple times without running the IC design through synthesis 110, place and route 120, timing analysis 130 and assembly 140 multiple times. After enough optimizations have been made to the IC design in floorplanning and power analysis operation 150, the IC design may be recompiled, i.e., the IC design will go through synthesis 110, place and route 120, timing analysis 130 and assembly 140 before configuring IC device 165. One skilled in the art should appreciate that most operations shown in flow 100 are optional. In other words, certain operations, e.g., floorplanning and power analysis operation 150, may be skipped if desired. However, the quality of the resulting IC design solution may be impacted by the removal of the optional operations.

Figure 2:
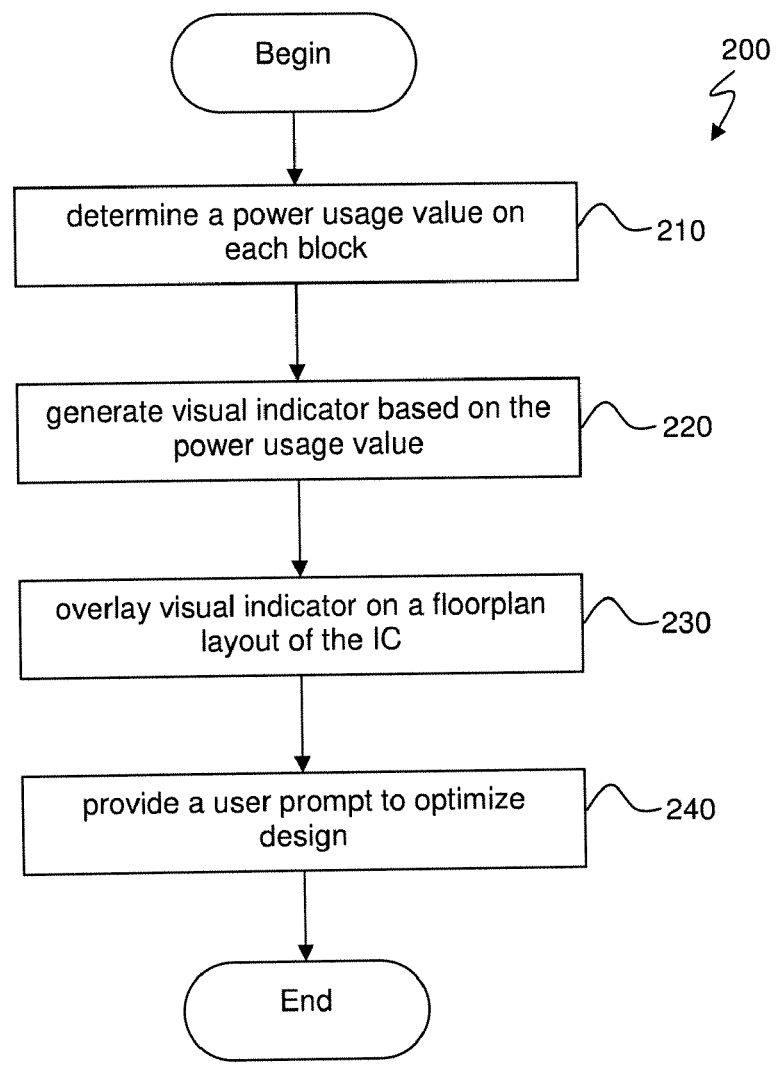
FIG. 2, meant to be illustrative and not limiting, shows a process flow to analyze a design on an IC as one embodiment in accordance with the present invention.

FIG. 2, meant to be illustrative and not limiting, shows process flow 200 to analyze a design on an IC as one embodiment in accordance with the present invention. In one embodiment, process flow 200 may be part of an EDA tool compilation flow, e.g., power analysis and floorplanning operation 150 of flow 100 in the embodiment of FIG. 1. In operation 210, the power usage value or the power dissipated by each block in the IC design is determined. Based on the power usage value, a visual indicator is generated in operation 220. In one embodiment, the visual indicator is a color map where each block in the IC design is represented with different colors based on its power usage or power dissipation value. In another embodiment, the visual indicator may be a color map showing potential power savings in different areas of the IC design. In yet another embodiment, the visual indicator may be a route map showing the route activity, i.e., route power dissipation value, route capacitance value, route length value, etc., of each of the routes in the design. It should be appreciated that alternative visual indicators other than the previous mentioned ones may be integrated in the embodiments described herein.

Referring still to FIG. 2, the visual indicator is then overlaid on top of a floorplan layout of the IC in operation 230. In an exemplary embodiment, the floorplan layout is generated during a compilation of the IC design using an EDA tool. The visual indicator may highlight different areas of the IC design that can be further optimized. A prompt to optimize the design is provided in operation 240. In one embodiment, the prompt is a dialog box with different optimization options that may be applied to the IC design. Based on the provided prompt, a circuit designer may select and optimize different parts of the IC design. In one embodiment, the circuit designer may modify the design in response to the prompt and the visual indicator is updated in real time based on the modification made by the designer. In such an embodiment, a real time power analysis, e.g., power analysis operation 150 in the embodiment of FIG. 1, can be performed on the IC design to provide an estimate of the potential improvement in the IC design before a full compilation is performed. A circuit designer can now update the design and receive instantaneous feedback from the tool without having to start a full compilation every time a change is made to the design.

Figure 3:
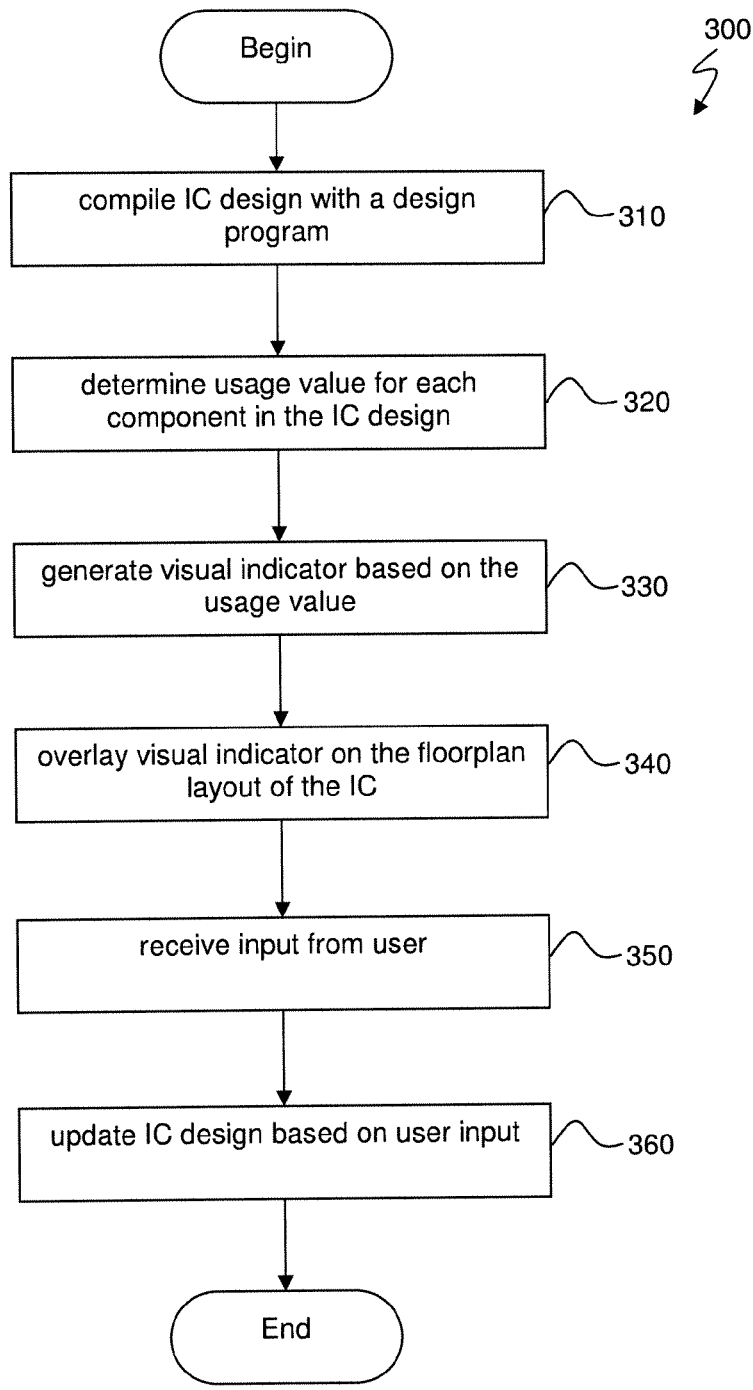
FIG. 3, meant to be illustrative and not limiting, shows a process flow to analyze an IC design as another embodiment in accordance with the present invention.

FIG. 3, meant to be illustrative and not limiting, shows process flow 300 to analyze an IC design as another embodiment in accordance with the present invention. The IC design is compiled with a design program in operation 310. The design program may be an EDA tool that is used to synthesize the IC design and generate the necessary binary files to configure the IC design into an IC device. In operation 320, a usage value for each of the different components in the IC design is determined. In one embodiment, the usage value is a block usage value, e.g., signal activity value, clock enable usage, etc., of different blocks in the IC design. In another embodiment, the usage value is a route usage value, e.g., route signal activity, route capacitance, route length, etc. In yet another embodiment, the usage value is a power usage or power dissipation value for each of the different components in the IC design. Based on the usage value, a visual indicator is generated in operation 330. The visual indicator is a graphical representation of the usage value for each of the different components in the IC design. According to one embodiment, the visual indicator is a graphical color map where different colors are used to represent the usage value, i.e., power dissipation value, block activity value, route usage value, etc., for every component in the IC design.

Referring still to FIG. 3, the visual indicator is overlaid on a floorplan layout of an IC in operation 340. According to one embodiment, the floorplan layout is a graphical representation showing the locations for logic gates, I/O pads, etc., on the IC. The visual indicator, overlaid on the floorplan layout, shows possible areas of optimization on the IC design. In an exemplary embodiment, the design program may provide a recommendation to the user to improve the design using the visual indicator, e.g., through a user prompt or a dialog box with recommendations or options to improve the IC based on the power usage of the IC design. In operation 350, a user input is received. According to one embodiment, the user input is a change made to the IC design to further improve or optimize the design based on the areas highlighted in the visual indicator. Optimizations may include, among others, updating the design to reduce power dissipation in different parts of the design and making functional changes to the design to reduce power usage. One skilled in the art should appreciate that optimizations can be performed by modifying placement constraints, i.e., constraining or placing long routes and clock networks closer to each other. In the exemplary embodiment of FIG. 1, the IC design is embodied in an HDL file. In such an embodiment, optimizations can be done in the HDL file by adding registers, moving registers, adding signals, etc. The IC design is updated in operation 360 without running a compile operation on the IC design. According to one embodiment, the IC design is analyzed based on the optimizations performed and the visual indicator is updated in real time based on the analysis and optimizations.

Figure 4A:
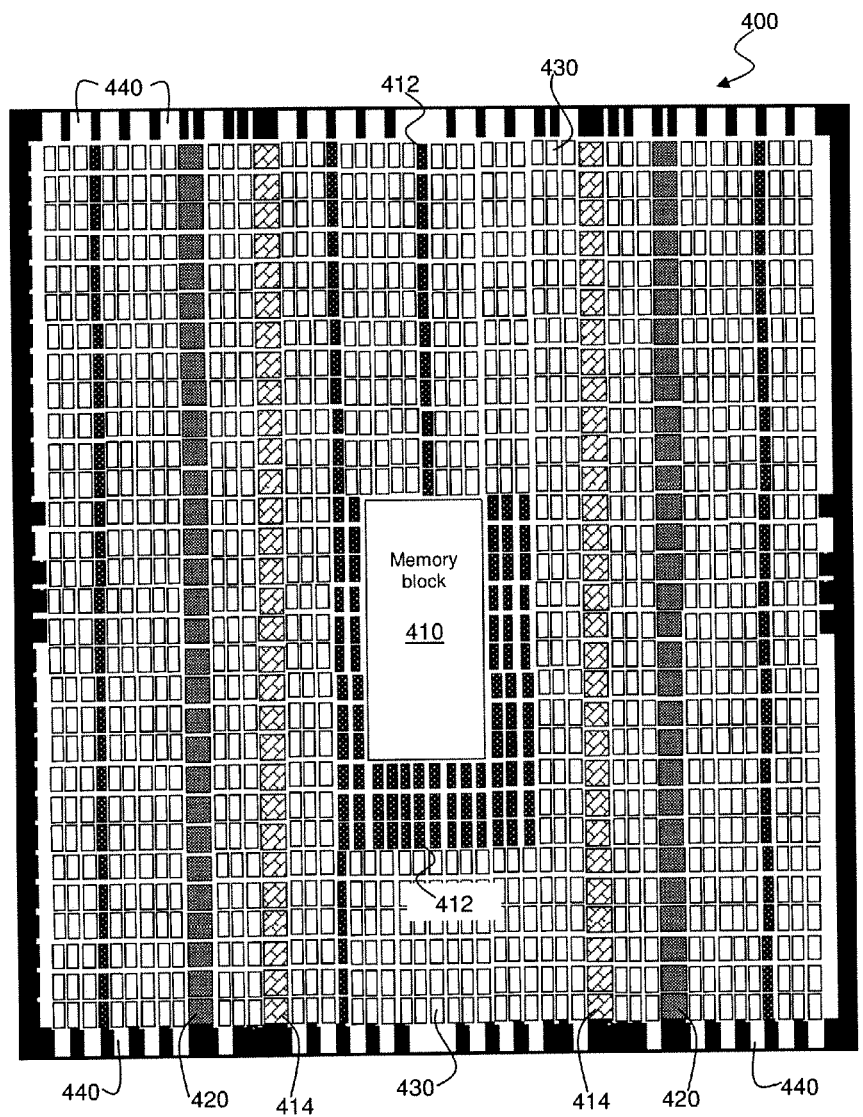
FIG. 4A, meant to be illustrative and not limiting, shows a floorplan layout of an IC device.

FIG. 4A, meant to be illustrative and not limiting, shows floorplan layout 400 of an IC device. Floorplan layout 400 provides a high level view of the device floorplan. In one embodiment, floorplan layout 400 is similar to floorplan layout 155 generated by floorplanning and power analysis operation 150 shown in FIG. 1. The placement of different resources within the IC is shown in floorplan layout 400. In the embodiment of FIG. 4A, floorplan layout 400 shows memory block 410 in the middle of the device. In an exemplary embodiment, memory block 410 may be a random-access memory (RAM) block. There may be arrays of smaller memory blocks on the IC. In the embodiment of FIG. 4A, memory arrays 412 and 414 are substantially smaller than memory block 410. For example, memory array 412 may be an array of 512-bit memory blocks and memory array 414 may be an array of 4096-bit memory blocks. Different memory blocks may be suitable for different applications and are used accordingly. Other resources available in the device may include digital signal processing (DSP) blocks 420. In the embodiment of FIG. 4A, arrays of DSP blocks 420 are placed in between multiple arrays of logic blocks 430. Logic blocks 430 may be grouped together to form bigger logic blocks and can be configured to perform logical functions desired by the user. Input/Output (I/O) elements 440 are located at the perimeter of the IC device, according to the embodiment of FIG. 4A. One skilled in the art should appreciate that different floorplan layouts may be generated for different IC devices with varying resources.

Figure 4B:
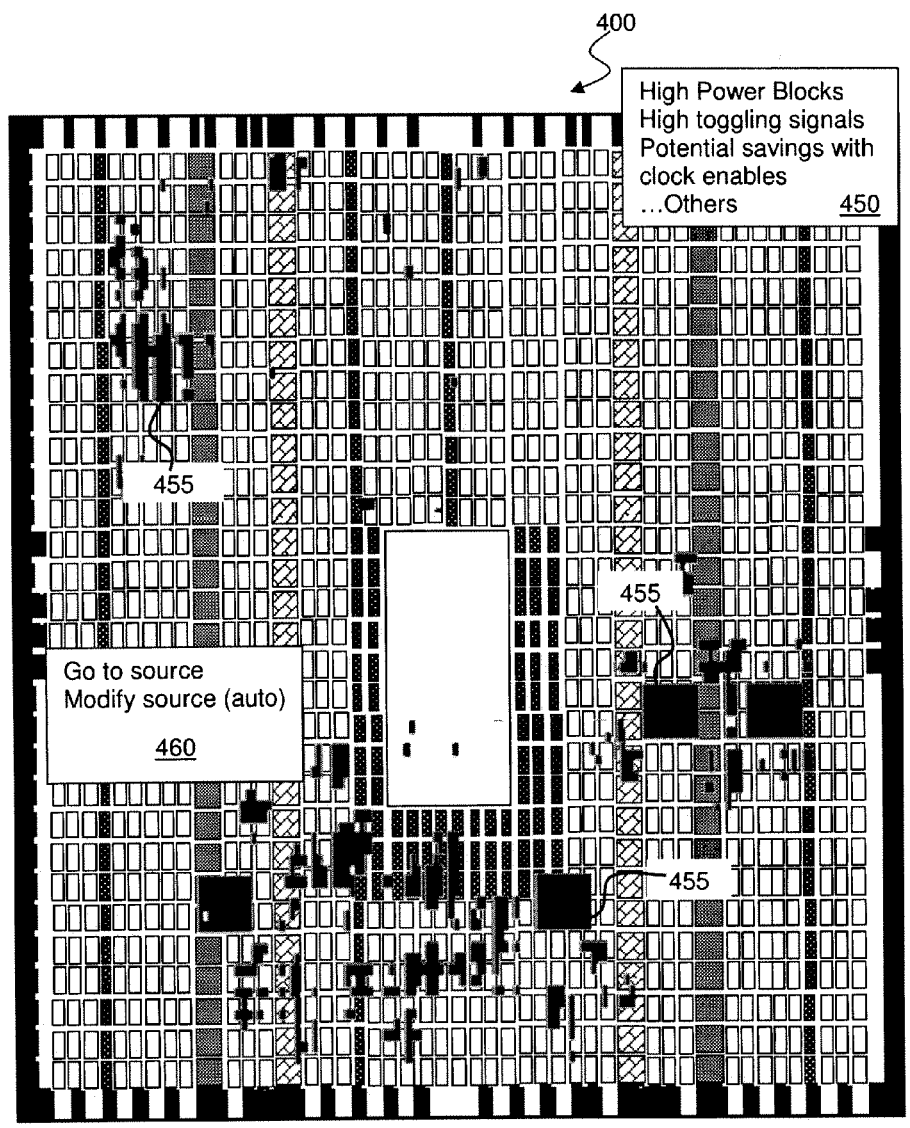
FIG. 4B, meant to be illustrative and not limiting, shows a visual map highlighting potential areas of optimization overlaid on a floorplan layout as one embodiment in accordance with the present invention.

FIG. 4B, meant to be illustrative and not limiting, shows a visual indicator, e.g., a color map, highlighting potential areas of optimization 455 overlaid on floorplan layout 400 as one embodiment in accordance with the present invention. One skilled in the art should appreciate that the color map is used as an exemplary visual indicator. As such, other types of visual indicators that can highlight the potential areas of optimization on an IC design may be used in this context. According to the embodiment of FIG. 4B, potential areas of optimization 455 are highlighted in a darker shade. In other embodiments, different colors or patterns may be used to represent varying power usage values. Dialog box 450 shows possible color map options to be overlaid on floorplan layout 400. In one embodiment, dialog box 450 is a user prompt that highlights all the different options, e.g., power usage values, route activity, etc., that can be shown in the color map. In an exemplary embodiment, dialog box 450 is a drop down menu with a list of different types of color maps that can be overlaid on floorplan layout 400. In the embodiment of FIG. 4B, several options, e.g., high power blocks, high toggling signals, potential savings, etc., are shown in dialog box 450. This means that a color map showing all the high power blocks in the IC design, a color map highlighting the areas with high toggling signals or a color map showing all the potential savings by using clock enables may be generated, according to the embodiment of FIG. 4B. Even though only a few choices are shown, one skilled in the art should appreciate that other relevant options may be provided in this context. For example, a color map showing the extent of different routes in the IC design or the signal activity on each route can be generated and overlaid on floorplan layout 400.

Referring still to FIG. 4B, the color map may show areas of potential power savings based on a suggested optimization technique, e.g., inserting additional pipeline registers. According to one embodiment, the color map may take into account power tradeoffs and lead users to areas of potential areas of the design that can be modified with a specific tradeoff, e.g., additional simultaneous switching noise (SSN), slack, or routing congestion. According to another embodiment, the color map can also be adjusted to show and highlight only specific areas or blocks, e.g., areas, blocks, or routes that exceed a certain threshold voltage, blocks within a percentage of power usage, etc. Different color maps highlighting different areas of the IC design can be combined and overlaid on top of each other, e.g., a color map showing block power and color map showing routing power. Interactive power optimizations can be provided, according to one embodiment. Dialog box 460 shows the options for a manual update ("Go to source") or an automatic update ("Modify source (auto)"). One skilled in the art should appreciate different interactive power optimization options can be provided through software macros that can be run from buttons, menu items, icons, hotkeys, etc. Multiple blocks or components on the IC design may be selected based on the color map and interactive power optimizations may be performed concurrently on all the selected components. One skilled in the art should appreciate that optimizations can be performed by moving registers, adding clock enable signals, etc. These changes may require user intervention as they may change the functionality of the IC design. The color map is updated based on the changes made to the design. In other words, highlighted areas 455 may change based on the changes made to the design. According to one embodiment, the color map is updated after a change is made to the design without recompiling the updated design. In this embodiment, the color map is updated in "real-time", i.e., the update is substantially instant, and prompt feedback is provided to the user based on the changes made.

Figure 5:
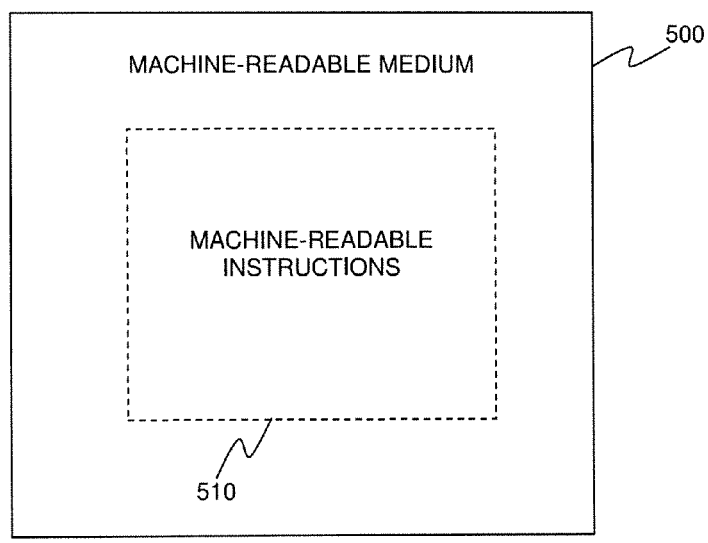
FIG. 5 is a simplified block diagram showing a machine-readable medium encoded with machine-readable instructions as an embodiment in accordance with the present invention.

The invention can also be embodied as machine-readable instructions 510 on machine-readable storage medium 500 as shown in FIG. 5. Machine-readable storage medium 500 is any data storage device that can store data, which can thereafter be read by a machine or a computer system. Illustrative examples of machine-readable storage medium 500 include hard drives, network attached storage (NAS), read-only memory, random-access memory, CDs, DVDs, USB drives, volatile and non-volatile memory, and other optical and non-optical data storage devices. Machine-readable storage medium 500 can also be distributed over a network-coupled computer system so that machine-readable instructions 510 are stored and executed in a distributed fashion. Machine-readable instructions 510 can perform any or all of the operations illustrated in FIGS. 2 and 3.

Figure 6:
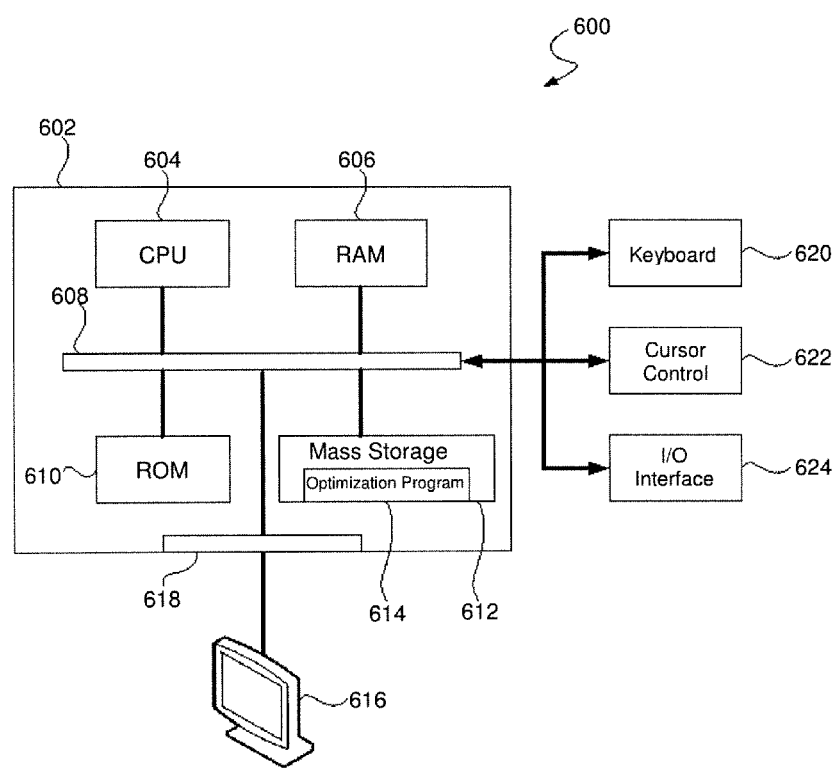
FIG. 6 is a simplified schematic diagram of a computer system for implementing embodiments of the present invention.

FIG. 6 is a simplified schematic diagram of a computer system 600 for implementing embodiments of the present invention. It should be appreciated that the methods described herein may be performed with a digital processing system, such as a conventional, general-purpose computer system. Special-purpose computers, which are designed or programmed to perform one function may be used in the alternative. In addition, the computer system of FIG. 6 may be used for the purpose of power analysis and optimization. The computer system includes a central processing unit (CPU) 604, which is coupled through bus 608 to random access memory (RAM) 606, read-only memory (ROM) 610, and mass storage 612. Mass storage device 612 represents a persistent data storage device such as a floppy disc drive or a fixed disc drive, which may be local or remote. Power analysis and optimization program 614 resides in mass storage 612, but can also reside in RAM 606 during processing. The optimization program also includes a floorplanning tool. It should be appreciated that CPU 604 may be embodied in a general-purpose processor, a special-purpose processor, or a specially programmed logic device.

Referring still to FIG. 6, display 616 is in communication with CPU 604, RAM 606, ROM 610, and mass storage device 612, through bus 608 and display interface 618. Display 616 is configured to display the user interface and visual indicators or graphical representations described herein. For example, according to one embodiment, display 616 will show a color map representing power dissipation on an IC design overlaid on top of a floorplan layout of the IC device. Keyboard 620, cursor control 622, and interface 624 are coupled to bus 608 to communicate information in command selections to CPU 604. For example, according to one embodiment, user input on power optimization can be received as a command selected with an input device (such as a mouse or keyboard) from a menu interface. This user input is then communicated to CPU 604. It should be appreciated that data to and from external devices may be communicated through interface 624.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for analyzing a design on an integrated circuit (IC), comprising:
    determining a power usage value for each logic element of a plurality of logic elements in the IC;
    generating a visual indicator to be associated with each logic element of the plurality of logic elements based on its corresponding power usage value;
    overlaying the visual indicator on a floorplan layout of the IC; and
    providing a prompt containing information to optimize the design based on the power usage value of each logic element of the plurality of logic elements, wherein at least one operation is executed through a processor.

2. The method of claim 1, further comprising:
    modifying the design in response to user input responsive to the prompt; and
    updating the visual indicator in real time based on a modification of the design.

3. The method of claim 2, further comprising:
    determining a potential power saving value based on the modification of the design; and
    generating a second visual indicator to be associated with each logic element of the plurality of logic elements based on the potential power saving value.

4. The method of claim 1, further comprising:
    determining a route activity value for each route of a plurality of routes in the design; and
    displaying a visual indicator associated with each route of the plurality of routes based on the route activity value.

5. The method of claim 4, wherein the route activity value comprises one of a power dissipation value, a capacitance value or a route length value.

6. The method of claim 1, wherein the generating the visual indicator includes generating a color map, wherein each logic element of the plurality of logic elements is assigned a color based on the power usage value.

7. The method of claim 1, further comprising:
    selecting a portion of the design in response to a user selection of a portion of the design; and
    optimizing the portion of the design without compiling the design.

8. A non-transitory machine-readable storage medium encoded with sequences of instructions for analyzing a design on an integrated circuit (IC), the sequences of instructions which, when executed by a machine, cause the machine to perform operations comprising:
    compiling the design of the IC with a design program;
    analyzing the design with the design program;
    calculating a power dissipation value for each circuit element of a plurality of circuit elements in the design; and
    displaying a visual indicator associated with a graphical representation of each circuit element of the plurality of circuit elements of the IC based on the power dissipation value.

9. The non-transitory machine-readable storage medium of claim 8, further comprising:
   receiving a user input;
   updating the design of the IC based on the user input;
   recalculating the power dissipation value based on the updating the design; and
   updating the visual indicator based on the recalculating of the power dissipation value.

10. The non-transitory machine-readable storage medium of claim 9, wherein the updating the design includes one of adding a register, moving a register or adding a signal to the design.

11. The non-transitory machine-readable storage medium of claim 9, wherein the updating the design reduces the power dissipation value.

12. The non-transitory machine-readable storage medium of claim 8, wherein the displaying the visual indicator comprises:
   assigning a color to each circuit element of the plurality of circuit elements based on the power dissipation value.

13. The non-transitory machine-readable storage medium of claim 8, further comprising:
   providing a recommendation to a user to improve the design based on the power dissipation value.

14. A method of analyzing a design on an integrated circuit (IC), comprising:
   compiling the design of the IC with a design program;
   determining a usage value for each logic block of a plurality of logic blocks in the design;
   generating a visual indicator to be associated with each logic block of the plurality of logic blocks based on its corresponding usage value;
   overlaying the visual indicator on a floorplan layout of the IC;
   receiving an input; and
   updating the design without recompiling the design based on the input, wherein the updating optimizes the design, wherein at least one operation is executed through a processor.

15. The method of claim 14, further comprising:
   updating the visual indicator based on the updating the design.

16. The method of claim 14, wherein the usage value comprises one of a signal activity value or a clock enable usage value.

17. The method of claim 14, further comprising:
   providing a prompt containing information needed to optimize the design based on the usage value for each logic block of the plurality of logic blocks.

18. The method of claim 14, further comprising:
   determining a route value on a plurality of routes in the design, wherein the route value includes one of route signal activity value, route capacitance value or route length value.

19. The method of claim 14, wherein the generating the visual indicator includes generating a color map, wherein each logic block of the plurality of logic blocks in the design is associated with a color based on the usage value.

20. The method of claim 14, further comprising:
   selecting a portion of the design in response to a user selection of a portion of the design, wherein the selecting is based on one of a threshold value or a percentage value; and
   generating the visual indicator for the portion of the design.

* * * * *